9156X

E. Sampson,

Cook-Stove.

Patented Oct. 10. 18[illegible]

Elnathan Sampson of Pierpont State of New York.

Letters Patent.

Figure 1:
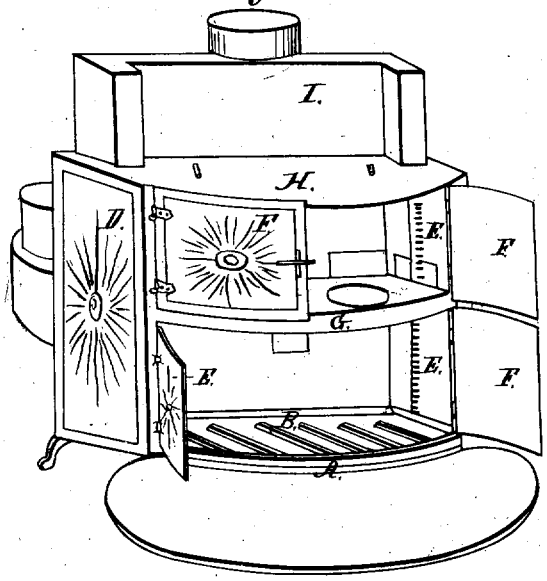

The schedule referred to in these Letters Patent and making part of the same
containing a description in the words of the said Elnathan Sampson himself of his im-
provement in the cooking Stove, to prevent the steam and heat from escaping into the room To all to whom these presents shall come
Elnathan Sampson of the Town of Pierpont in the County of St Lawrence and State
of New York sends greeting. Be it known that I the said Elnathan Sampson, have
invented a new and useful improvement not known or used before in the making
or manufacturing of Cooking Stoves which invention and the manner of using it is
as follows, The general improvement of this new Stove are its great convenience for Cooking
generally and especially for boiling without having the inconvenience of the steam in the
room; its capacity to give out much heat in proportion to the quantity of fuel used, and
when necessary to be used for Cooking with giving out very little heat; being used at all
times if desired as an open Stove and having much more draught than any open
Stove now in use. It may also be ready by leaving off the back boiler part and
leaving out also the moveable plate for boilers, in the front part, and it then makes
a very superior open parlor Stove, so constructed that it cannot fail to draw well:
In either of these ways it is designed to be used. and it may also be used with
all the cooking apparatus except the back part for boilers.
These improvements will be obvious from a reference to the model furnished to
the patent office, and to the drawing and its explanations accompanying & forming
a part of this Specification,
It will be seen that the plates stand upright and the Stove opens with folding
doors at the front side. The oven marked with the letter A. in fig 1, covers the whole
bottom of the Stove, the bottom of the oven being raised a few inches above the bot-
tom plate of the Stove, to admit the fire under it. The fire is placed upon
a grate marked B. which is moved up and down by a rack and pinion worked
with a crank upon the outside of the stove, there being a rack and pinion at 1st Disclaimer entered, 1st June 1837.

each end of the grate with a rod or axle passing across from one to the other, so that both are worked with one crank. The back plate contains three flues, one in the centre and one at each side a little above through which the fire passes to the pipe, by shutting the dampers to these flues, (the dampers not being represented in the model) the fire will pass down the flue at each end and will go under the oven and up behind it. It is believed the plan of graduating the distance of the fire from the oven will be a useful improvement for the different kinds of baking.

A slide is placed under the grate which may be removed to let the ashes down into a box to be put in the oven for the purpose of cleaning the stove —

Figure 3:
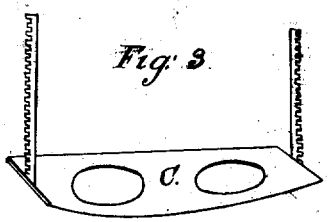

The apparatus for cooking by boiling is placed above the grate and is marked with the letter C, it being drawn out separately in fig. 3. It is a horizontal plate made in the model for two boilers, it is moved up and down with a rack and pinion at each end worked with a crank in the same manner as the grate is moved the crank for the grate being at one end of the stove, and that for the boiler at the other end, In this manner the boiler may with perfect ease be moved near the fire or at a distance from it, part of the top plate marked H. is made to be raised up with hinges for a more easy access to the boilers or it may be shut down having a rim to catch the edge of the two upper doors which when shut will prevent any steam of the boilers from escaping in to the room, there being an opening for the steam to pass up into the Russia iron case on the top of the stove and then off into the pipe. The ends of the stove are double, the two interior plates being placed so far from the exterior plates as to admit the fire to pass down between them and under the oven, each interior plate having a flue in it. There is a small aperture at the bottom of one of the exterior end plates to let in a rod or instrument to clean out soot &c from under the oven There are four folding doors in front being a little curved and a cross bar between the setts of doors upon the top of the stove, is a Russia iron box or case marked I. open in front being double to admit the racks of the grate and the boiler plate through which the fire principally passes which adds greatly to the heat of the room. It is fastened to the stove with rods and [illegible]

Figure 2:
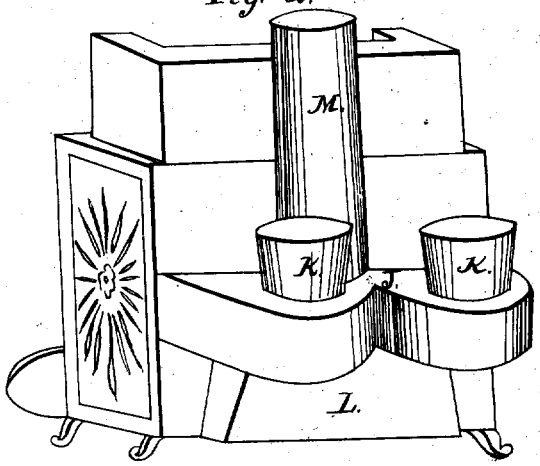

A tin baker may be used to advantage placed on top of the stove in front of this box and between its sides or ends, The back part of the stove shown by Figures 2 contains two large boilers which are set [illegible]

[illegible]

9156X in the bottom plate of that part of the stove guarded against any injury from the wood the fire passing from the front part through flues at sound the boiler up into the pipe. In witness whereof I have hereunto set my hand this twenty day of august 1835.

Elnathan Sampson

Witnesses B. G. Baldwin
Wm. A. Dart 1040 wds (Drawing)

Ex. C
Chf